United States Patent
Bargelé et al.

[11] Patent Number: 5,938,518
[45] Date of Patent: Aug. 17, 1999

[54] METHOD FOR SEPARATING A SUPERFICIAL LAYER AND APPARATUS FOR CARRYING OUT THE METHOD

[75] Inventors: Norbert Bargelé; Rüdiger Buddruss, both of Stockelsdorf; Thorsten Lorenzen, Klein-Schlamin, all of Germany

[73] Assignee: Nordischer Maschinenbau Rud. Baader GmbH + Co. KG, Lubeck, Germany

[21] Appl. No.: 08/293,322

[22] Filed: Aug. 22, 1994

[30] Foreign Application Priority Data

Sep. 1, 1993 [DE] Germany .............................. 43 29 380

[51] Int. Cl.$^6$ ........................................................ A22B 5/16
[52] U.S. Cl. .............................................................. 452/127
[58] Field of Search ...................................... 452/127, 125

[56] References Cited

U.S. PATENT DOCUMENTS

| | | | |
|---|---|---|---|
| 2,715,427 | 8/1955 | Townsend | 452/127 |
| 3,529,318 | 9/1970 | Jobmann | 452/127 |
| 3,739,428 | 6/1973 | Barters et al. | 452/127 |
| 4,393,761 | 7/1983 | Murphy | 99/589 |
| 4,628,806 | 12/1986 | Murphy | 99/486 |
| 5,288,264 | 2/1994 | Braeger | 452/127 |

FOREIGN PATENT DOCUMENTS

| | | |
|---|---|---|
| 2136038 | 1/1972 | Germany . |
| 3700324 | 8/1987 | Germany . |

*Primary Examiner*—Willis Little
*Attorney, Agent, or Firm*—Fay, Sharpe, Beall, Fagan, Minnich & McKee

[57] ABSTRACT

A method for processing fish fillets by separating a superficial layer of said fillet comprising the skin and an apparatus for performing this method is described. The apparatus essentially comprises a conveying roller (3) for carrying the fish fillets skin-side down and a pressing shoe (6) which, with its pressing surface (7) forms a conveying gap witht he conveying roller (3). At the input side of the conveying gap, the pressing shoe (6) is formed as a first knife (11), above which a driven second knife (16) is arranged in a knife guide (14). With this arrangement, it is possible to detach a further superficial layer apart from the skin layer and to collect these two layers separately.

18 Claims, 1 Drawing Sheet

METHOD FOR SEPARATING A SUPERFICIAL LAYER AND APPARATUS FOR CARRYING OUT THE METHOD

BACKGROUND OF THE INVENTION

1. Field of the Invention

The invention relates to a method for processing fish fillets, and, in particular, to the separation of a superficial layer containing skin, and also to an apparatus comprising a conveying roller with a skid-resistant or gripping surface, a pressing shoe having a pressing surface facing the conveying roller surface, the pressing shoe being positioned to leave a narrow gap between its pressing surface and the conveying roller surface, and a cutting mechanism comprising a first knife having its cutting edge lying near to the surface of the conveying roller and a second knife having its cutting edge lying remote from the surface of the conveying roller.

2. Prior Art

An apparatus is known from U.S. Pat. No. 4,628,806, which comprises a conveying roller, whereby the conveying roller surface is arranged to lie opposite the cutting edges of two knives spaced at different distances. The apparatus is furthermore provided with a pressing shoe having a pressing surface spaced from the surface of the conveying roller. The cutting edge of the more closely spaced first knife is integrated in the pressing shoe as a rigid component thereof. The further spaced second knife is also rigidly formed in the same manner. A conveyor is located both in front of and above the conveying roller for feeding the material to be processed or for supporting the conveying of the same. After the initial cut of the first knife, the conveying roller ensures in cooperation with the pressing surface that the rind is drawn away as the separation proceeds.

This apparatus is designed for removing rind from fat. In this process, the second knife has the task of removing a layer which comprises the rind and a layer of fat, while the first knife is provided to separate the rind from the fat layer. The course of this process is such that first the second knife and then the first knife come into operation.

An apparatus of this kind is not at all suitable for the corresponding processing of fish fillets. This is due particularly to the lack of stability of shape and the soft consistency of such fillet product. These characteristics necessitate that at least the separating cut made in the muscle meat is carried out by drawing cutting, for example by means of a knife driven to oscillate. Such a knife is shown in DE 37 00 324, for example.

On employing such a knife it is essential, and a more or less unconditional prerequisite, that, at least in the processing area, the fish lies flat, i.e. not compressed and fold-free, in order to avoid irregularities, like patches of skin, occurring which reduce the quality of the finished product. This is intended to be achieved by means of drawing conveying, as is also shown in DE 37 00 324, to which end there is employed a pressing shoe with a pressing surface which forms a conveying gap together with the skinning roller, through which the severed surface layer is pulled away after separation.

This will function only so long as the surface layer to be separated relates to the relatively tough skin, which allows a correspondingly strong hold in said conveying gap. If, however, muscle meat is to be cut, as is often required for the purpose of separating a fat layer or a layer of dark meat, for instance, this process fails because the soft consistency of such a surface layer does not ensure secure conveying due to lack of grip.

3. Objects of the Invention

A first object of the invention is to suggest an improved separating method for severing a surface layer with skin, which avoids the above mentioned drawbacks.

A further object of the invention is to provide a separating method for severing a surface layer of any desired thickness.

A still further object of the invention is to suggest an apparatus for carrying out such a method in an economic manner.

SUMMARY OF THE INVENTION

In a method for processing fish fillets by separating a superficial layer of such fillets comprising the skin, these objects are achieved according to the invention by the step of removing the skin itself separately either concurrently with or directly before the separation of the superficial layer.

The above method may preferably be performed according to the invention by an apparatus comprising a conveying roller having a skid-free or gripping outer surface, a pressing shoe having a pressing surface facing said outer surface, said pressing shoe being positioned such as to leave a narrow gap between its pressing surface and said outer surface and a cutting mechanism including a first knife having a first cutting edge lying close to the outer surface of said conveying roller and a second knife having a second cutting edge lying distal from said outer surface, wherein said first knife is formed as a fixed knife and said second knife is formed as a driven knife, and the second cutting edge of said distal second knife is positioned to lie level with the first cutting edge of said adjacent first knife or displaced downstream of the same in the fish conveying direction.

The advantages achievable with this method and apparatus are, in particular, that, on the one hand, the skin is securely gripped in a known manner and that a drawing conveying, i.e. a conveying having a stretching effect on the fillet, is achieved, and that, on the other hand, a problem-free separation of a second superficial layer may be carried out, since at the point of separation, the meat portions to be separated are subject to the reinforcing effect of the skin.

Further advantageous features of the apparatus according to the invention may be taken from the dependent claims.

BRIEF DESCRIPTION OF THE DRAWINGS

Other and further objects and advantages of the present invention will be apparent from the following description and claims and are illustrated in the accompanying drawings which, by way of illustration, schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings.

DETAILED DESCRIPTION OF THE PREFERRED EMBODIMENTS

Figure 1:
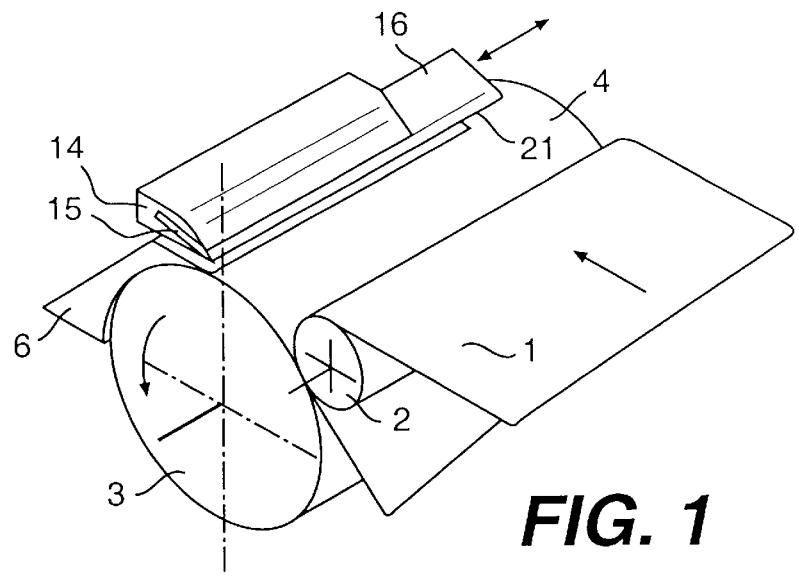
FIG. 1 shows a partial perspective view of the apparatus according to the invention.
Figure 2:
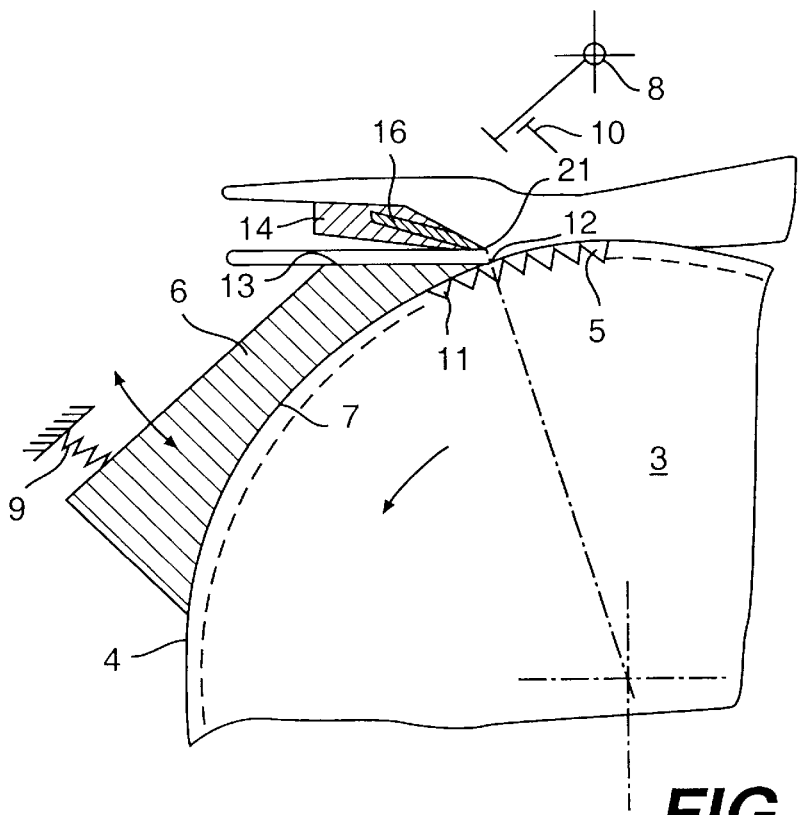
FIG. 2 shows an enlarged partial longitudinal section of the apparatus according to FIG. 1.
Figure 3:
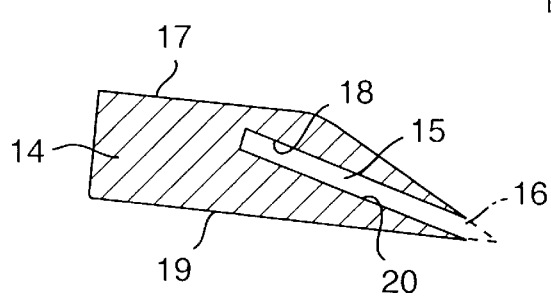
FIG. 3 shows a cross-section through the knife guide.

A deflection roller 2 on the discharge side of a feed belt 1 and a conveying roller 3 are mounted in a non-shown frame of a skinning machine for fish fillets, and are both driven in an appropriate manner to rotate in the same sense. The outer surface 4 of the conveying roller 3 is provided with longitudinal grooves 5 in a known manner. In the region of the discharge side of the conveying roller 3 its outer surface 4 faces a pressing shoe 6 defining a pressing surface 7, the radius of curvature of the pressing shoe and surface corresponding essentially to that of the outer roller surface 4. The pressing shoe 6, which extends over the whole length of the conveying roller 3, is mounted on an axis 8 so as to be resiliently displaceable away from the conveyor roller 3 against the force of a spring 9, and is supported in its rest position with regard to the gap width between its pressing surface 7 and the outer surface 4 of the conveying roller by means of an adjustable stop 10. The pressing shoe 6 is upwardly limited by a back face 13, which extends parallel to the outer surface 4 of the conveying roller 3 and forms an acute angle with the upper end portion of the pressing surface 7, whereby the apex of this angle is designed as a cutting edge 12, so that this part of the pressing shoe 6 is formed as a first knife 11. As can be seen in greater detail in FIG. 3, a knife guide 14 having a guide slit 15 for holding a knife blade 16 is located above the back surface 13 of the pressing shoe 6. The knife guide 14 is chamfered on its upper side 17 and, together with the guide surface 18 upwardly limiting the guide slit 15, forms a wedge-shaped element. The lower side 19 of the knife guide 14 also forms a wedge-shaped element together with the guide surface downwardly limiting the guide slit 15. In this way, the lower side 19 and the back surface face 13 of the pressing shoe 6 together form an acute angle which opens in the direction of rotation of the conveying roller 3. The knife guide 14 is arranged in a known and not represented manner to be adjustable with respect to the distance of its lower side 19 to the back surface of the pressing shoe 6.

The knife blade 16 is made of band or strip steel and dimensioned with regard to its width such that its cutting edge 21 projects out of the guide slit 15 in a direction opposing the conveying direction of the conveying roller 3. The knife blade 16 is driven to oscillate in a manner which will not be described in detail and which, for example, can correspond to the concept according to DE 37 00 324.

The operation of the apparatus is described in the following. A fish fillet to be skinned is placed on the outer surface 4 of the rotating conveying roller 3 by means of the feed belt 1 to lie on its skin side with its tail-end leading, and is conveyed further by said conveying roller 3. In this way, the tail-end becomes partially embedded in the longitudinal grooves 5 of the outer surface 4. This tail end thus arrives under the cutting edge 12 of the first knife 11, and shortly afterwards arrives with the already detached parts of skin in the gap between the pressing surface 7 and the outer surface 4, which immediately leads to a secure conveying engagement of the progressively detached skin. During this operation, the pressing shoe 6 experiences a lifting force which, after overcoming the force of the spring 9, has the effect that the pressing surface 7 slides on the inner surface of the tough skin and, by entraining the cutting edge 12, is brought to a position spaced from the outer surface 4 by a distance which corresponds to the thickness of the skin to be removed.

Directly with or after the initial cut resulting from the gripped conveying, the leading end of the fillet reaches the cutting edge 21 of the second knife blade 16, which progressively separates a material layer lying under the skin. The conveying engagement is applied to the skin, while this conveying force is transferred to the fillets as a pulling or drawing force in the area of separation of the cutting edge 12.

By use of suitable guide means, the skin and the material layer may be collected separately.

LIST OF REFERENCE NUMERALS

1. Feed belt
2. Deflection roller
3. Conveying roller
4. Outer Surface
5. longitudinal groove
6. Pressing shoe
7. Pressing surface
8. Axis
9. Spring
10. Stop
11. First knife
12. Cutter/cutting edge
13. Back surface
14. Knife guide
15. Guide slit
16. Knife blade (second knife)
17. Upper side
18. Guide surface
19. Lower side
20. Guide surface
21. Cutter/cutting edge

We claim:

1. A method for processing fish fillets at least partially covered with skin, said method comprising the steps of:
    a) separating a superficial layer from said fillet, and
    b) separating said skin from said superficial layer, wherein said skin is removed from said superficial layer at a time no later than concurrently with the separation of the superficial layer from said fillet.

2. A method as claimed in claim 1, wherein the separation of said skin from said superficial layer is commenced directly before the commencement of separation of said superficial layer from said fillet.

3. An apparatus for carrying out a method for processing fish fillets at least partially covered with skin by separating a superficial layer from said fillet, and separating said skin from said superficial layer, wherein said skin is removed from said superficial layer at a time no later than concurrently with the separation of the superficial layer from said fillet, said apparatus comprising:
    a) conveying roller means for conveying said fish fillets in a conveying direction, said conveying roller means having a gripping outer surface;
    b) pressing means defining a pressing surface facing said outer surface, said pressing means being positioned such as to leave a narrow gap between its pressing surface and said outer surface; and
    c) cutting means including
        c1) first knife means having a first cutting edge lying proximal to said outer surface, and
        c2) second knife means having a second cutting edge lying distal from said outer surface,
wherein said first knife means is arranged to be fixed and said second knife is arranged to be driven, and wherein said second cutting edge of said distal second knife is arranged to lie in at least one of level with said first cutting edge of said adjacent first knife and downstream of said first cutting edge when seen in said fish conveying direction.

4. An apparatus for carrying out a method for processing fish fillets at least partially covered with skin by separating a superficial layer from said fillet, and separating said skin from said superficial layer, wherein said skin is removed from said superficial layer at a time no later than concurrently with the separation of the superficial layer from said fillet, said apparatus comprising:
  a) conveying roller means for conveying said fish fillets in a conveying direction, said conveying roller means having a gripping outer surface;
  b) pressing means defining a pressing surface facing said outer surface, said pressing means being positioned such as to leave a narrow gap between its pressing surface and said outer surface; and
  c) cutting means including
    c1) first knife means having a first cutting edge lying proximal to said outer surface, and
    c2) second knife means having a second cutting edge lying distal from said outer surface,
  wherein said first knife means is arranged to be fixed and said second knife is arranged to be driven, and wherein said second cutting edge of said distal second knife means is arranged to lie downstream of said first cutting edge when seen in said fish conveying direction.

5. An apparatus as claimed in claim 3, wherein said first cutting edge is formed as a component of said pressing means, said pressing surface extending directly downstream of said first cutting edge in the rotation direction of said conveying roller.

6. An apparatus as claimed in claim 4, wherein said first cutting edge is formed as a component of said pressing means, said pressing surface extending directly downstream of said first cutting edge in the rotation direction of said conveying roller.

7. An apparatus as claimed in claim 3, wherein said second knife means is formed as a blade mounted in a knife guide.

8. An apparatus as claimed in claim 4, wherein said second knife means is formed as a blade mounted in a knife guide.

9. An apparatus as claimed in claim 5, wherein said second knife means is formed as a blade mounted in a knife guide.

10. An apparatus as claimed in claim 6, wherein said second knife means is formed as a blade mounted in a knife guide.

11. An apparatus as claimed in claim 3, wherein said pressing means together with said first knife means is mounted to be resiliently displaceable against the force of a spring to alter the spacing between said pressing surface and said outer surface, and wherein said second knife means is arranged to be adjustable with respect to the spacing of said second cutting edge from said outer surface.

12. An apparatus as claimed in claim 4, wherein said pressing means together with said first knife means is mounted to be resiliently displaceable against the force of a spring to alter the spacing between said pressing surface and said outer surface, and wherein said second knife means is arranged to be adjustable with respect to the spacing of said second cutting edge from said outer surface.

13. An apparatus as claimed in claim 5, wherein said pressing means together with said first knife means is mounted to be resiliently displaceable against the force of a spring to alter the spacing between said pressing surface and said outer surface, and wherein said second knife means is arranged to be adjustable with respect to the spacing of said second cutting edge from said outer surface.

14. An apparatus as claimed in claim 6, wherein said pressing means together with said first knife means is mounted to be resiliently displaceable against the force of a spring to alter the spacing between said pressing surface and said outer surface, and wherein said second knife means is arranged to be adjustable with respect to the spacing of said second cutting edge from said outer surface.

15. An apparatus as claimed in claim 7, wherein said pressing means together with said first knife means is mounted to be resiliently displaceable against the force of a spring to alter the spacing between said pressing surface and said outer surface, and wherein said second knife means is arranged to be adjustable with respect to the spacing of said second cutting edge from said outer surface.

16. An apparatus as claimed in claim 8, wherein said pressing means together with said first knife means is mounted to be resiliently displaceable against the force of a spring to alter the spacing between said pressing surface and said outer surface, and wherein said second knife means is arranged to be adjustable with respect to the spacing of said second cutting edge from said outer surface.

17. An apparatus as claimed in claim 9, wherein said pressing means together with said first knife means is mounted to be resiliently displaceable against the force of a spring to alter the spacing between said pressing surface and said outer surface, and wherein said second knife means is arranged to be adjustable with respect to the spacing of said second cutting edge from said outer surface.

18. An apparatus as claimed in claim 10, wherein said pressing means together with said first knife means is mounted to be resiliently displaceable against the force of a spring to alter the spacing between said pressing surface and said outer surface, and wherein said second knife means is arranged to be adjustable with respect to the spacing of said second cutting edge from said outer surface.

* * * * *